Nov. 18, 1941.   P. CHAPMAN   2,262,797
POWER TRANSMISSION
Filed June 15, 1940

Paul Chapman
INVENTOR.

Patented Nov. 18, 1941

2,262,797

UNITED STATES PATENT OFFICE 2,262,797

POWER TRANSMISSION

Paul Chapman, Bayside, N. Y.

Application June 15, 1940, Serial No. 340,689

4 Claims. (Cl. 74—303)

My invention in power transmission provides means whereby the torque of a driving shaft may be used to drive two other shafts with their torques in constant relation but with their relative speeds variable. The torques of the two driven shafts are clockwise and anti-clockwise, and may be equal because means are provided for compensating for the torque of the driving shaft.

This invention may be used to great advantage in the propulsion of ships and airplanes, by attaching right or left propellers to the two driven shafts, so that each propeller drives the fluid along the axis of the shafts and in the same direction in respect thereto. Because the tangential movement of the fluid produced by the leading propeller may, in this invention, be utilized to counteract the opposite tangential movement of that produced by the following propeller, nearly all the work of the propellers is used to propel the ship or airplane forward. It is therefore apparent that with this invention it is not necessary, for efficiency, to adjust the angularity of the propeller blades for each speed so that the tangential movement is the minimum, because the tangential movement of the fluid does not then represent lost work.

When used in airplanes or ships, this invention renders the construction and adjustment of special devices for balancing the torque of the driving shaft unnecessary.

Figure 1:
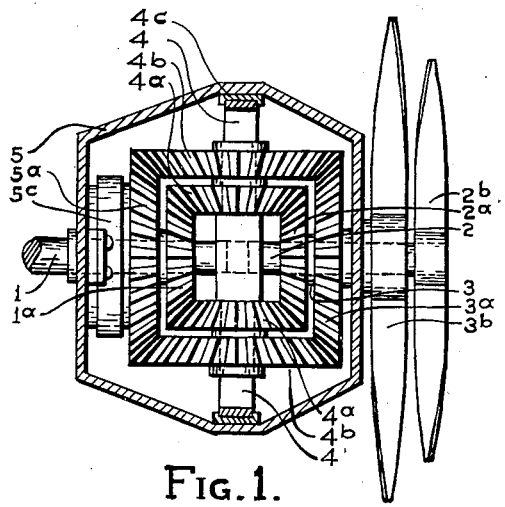
Figure 3:
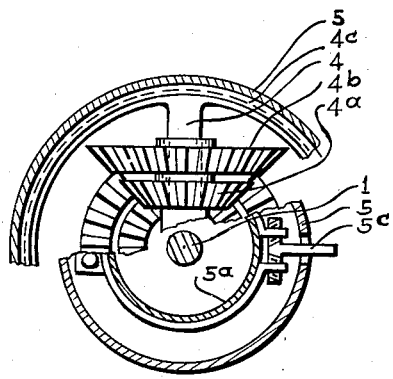
Figure 2:
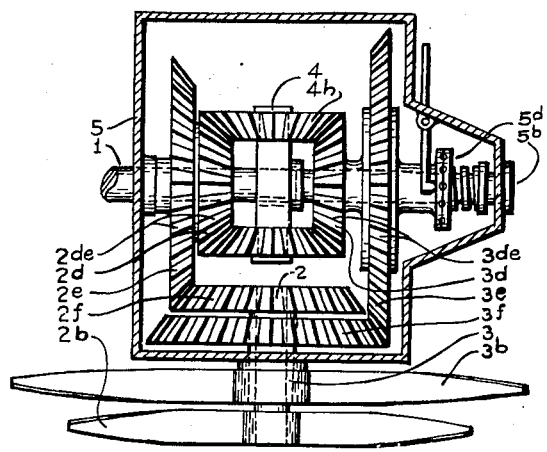
Figure 4:
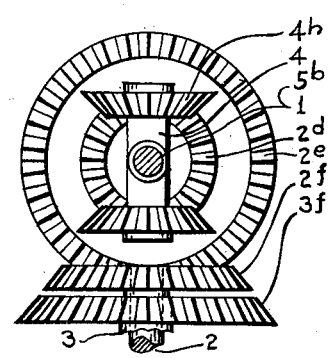
Figure 5:
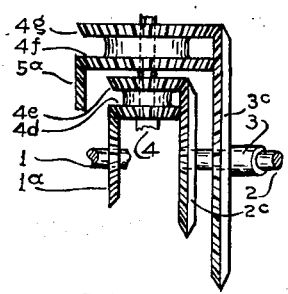

Referring to the accompanying drawing, Fig. 1 is a cutaway sectional view showing the construction with the driving and driven shafts co-axial. Fig. 2 is a cutaway sectional view showing the construction adapted for use with the axis of the two driven shafts perpendicular to the axis of the driving shaft. Fig. 3 is a view at right angles to Fig. 1 and showing the rotating axle and gears. Fig. 4 is a view at right angles to Fig. 2 and showing the rotating axle and gears thereof. Fig. 5 is a view showing the gear trains of an adaption for use where different relative torques of driving and driven shafts are required.

Referring again to Figs. 1 and 3, the driving shaft 1, the driven shaft 2 and the hollow driven shaft 3, are co-axial, with the torque on the shaft 2 being reversed from that on the shafts 1 and 3. The torques of the shafts 1 and 2 balance each other through the bevel gear 1a keyed to the shaft 1, the bevel gear 4a free to revolve about the rotating axle 4, and the bevel gear 2a keyed to the shaft 2. The torque of the shaft 3 is balanced by the torque on the bevel gear 5a fixed to the gear box 5, this torque being transferred through the bevel gear 4b in mesh with gear 3a keyed to the shaft 3 and with the gear 5a, the gear 4b being free to revolve about the rotating axle 4. The axle 4 is attached to the concentric bearing 4c so that it is free to revolve about the axis of the shafts 1, 2 and 3. The pressure from the gear 1a and its balancing reaction from the gear 2a is resisted through the gear 4a by the axle 4. This pressure tending to revolve the axle 4 is resisted by the gear 4b which in turn exerts a pressure on the gear 3a thereby turning the shaft 3 and also a pressure on the stationary gear 5a connected to the gear box 5 by the device 5c. By varying the respective sizes of the gears 1a, 4a, 2a to 3a, 4b, 5a, the driving torque of the shaft 1 may be balanced to any degree. It is seen that the torque on the shaft 2 is opposite in direction to that on the shaft 3, and tends to turn the propeller 2b keyed to the shaft 2 in opposite direction to that tending to turn the propeller 3b keyed to the shaft 3. Because the pressures on all gears are not changed for any position of rotation of the axle 4, it necessarily follows that the movement of the axle 4 does not vary the torques exerted through the gears. However, the movement of the axle affects the speed of both the driven shafts, the speed of revolution of the shaft 3 being twice that of the axle 4 and the speed of revolution of the shaft 2 being the algebraic sum of twice the speed of the axle 4 and the speed of the shaft 1. The construction therefore is a constant torque variable speed power transmission.

Referring again to Figs. 2 and 4, wherein an adaption is made for operating the driven shafts at right angles to the driving shaft, the rotating axle 4 is fixedly attached to and revolves with the driving shaft 1. The pressure from the shaft 1 is exerted equally through the bevel gears 4h free to revolve about the axle 4, upon the bevel gear 2d and upon the bevel gear 3d. The bevel gear 2d and a larger bevel gear 2e are fixedly attached to each other and form a unit 2de free to revolve about the axis of the drive shaft. Likewise the gear 3d is connected by the clutch 5d to the bevel gear 3e, and forms a unit 3de revolvable together with the shaft 5b and the moving part of the clutch 5d coaxially with the drive shaft 1. The gear 2e is in mesh with a bevel gear 2f keyed to the driven shaft 2, and similarly the gear 3e is in mesh with a bevel gear 3f keyed to the driven shaft 3. It is seen that the torque on the shafts 2 and 3 are in constant relation to each other because each receives half of the torque of the driving shaft 1 from the gears 4h. The revolution of the gears 4h about the axle 4, without changing the pressures, changes the relative speeds of the gears 2d and 3d and consequently the relative speeds of the driven shafts 2 and 3. This construction therefore provides a constant torque variable speed transmission with the driven shafts perpendicular to the driving shaft.

Referring again to Figs. 1 and 5, the bevel gear 4a is replaced by the bevel gear 4d in mesh with the gear 1a, and the bevel gear 4e in mesh with the bevel gear 2c keyed to the driven shaft 2. The gears 4d and 4e being fixedly attached to each other for revolving about the axle 4, form a unit that balances the pressure from the gear 1a with a reaction exerted on the gear 2c, and so by selecting the proper size of gears the torques on the shafts 1 and 2 are brought into constant though not necessarily equal relation. The gear 4b Fig. 1 is replaced by the bevel gear 4f in mesh with the fixed gear 5a and the bevel gear 4g in mesh with the bevel gear 3c keyed to the driven shaft 3. The gears 4f and 4g are fixedly attached to each other for revolution about the axle 4, and thus the torque on the fixed gear 5a and the torque on the shaft 3 may be brought into constant but not necessarily equal relation.

Referring again to Figs. 1 and 2, it is seen that when the friction device 5c is released to permit the gear 5a to revolve freely, or the friction clutch 5d is released to permit the gears 3e and 3f to rotate independently of each other, the driven shafts 2 and 3 may be revolved without any resulting motion or torque on the driving shaft 1. The release of the clutch as shown in Figs. 1 or 2, thus enables the ship or airplane to coast through the fluid without turning over its engine and without substantial drag from the propellers.

Referring again to Figs. 1 and 2, it is apparent that the shafts 2 and 3 may be used as driving shafts and the shaft 1 as a driven shaft. This condition may arise when the device is used as a turbine, or when the ship or airplane using the device is moving through the fluid and the shaft 1 is attached to a power storage or power consuming machine.

I claim:

1. In power transmission, a revolving driving shaft with a gear keyed thereto, a revolvable driven shaft co-axial with said driving shaft and having a gear keyed thereto, a rotatable axle with its axis perpendicular to and intersecting the axis of the aforesaid driving shaft, gear means revolvable about the said axle and in mesh with aforesaid two gears for balancing the pressures on said two gears with said axle acting as the fulcrum, a gear box and a ring gear fixedly attached thereto and concentric with aforesaid driving shaft, a hollow revolvable driven shaft co-axial with aforesaid driving shaft and having a ring gear keyed thereto, gear means revolvable about the aforesaid axle and in mesh with the aforesaid two ring gears for balancing the pressures on the said two ring gears with said axle acting as the fulcrum, a ring bearing between aforesaid gear box and aforesaid rotatable axle said bearing being co-axial with aforesaid driving shaft, means for transmitting the power of a driving shaft to two driven shafts at predetermined torque ratios but at speed ratios dependent on the relative torques of said driven shafts substantially as described.

2. In power transmission, a revolving driving shaft and an axle perpendicular and fixedly attached thereto with its axis intersecting the axis of said shaft, a driven shaft perpendicular to aforesaid driving shaft with a gear keyed thereto, a hollow driven shaft co-axial with aforesaid driven shaft and having a ring gear keyed thereto, gear means in mesh with the aforesaid gear keyed to said driven shaft and concentric with aforesaid driving shaft, gear means in mesh with the aforesaid ring gear keyed to said hollow driven shaft, and concentric with aforesaid driving shaft, gears rotatable about the aforesaid axle in mesh with and balancing the pressures on both the aforesaid gear means keyed to the aforesaid driven shaft and the gear means keyed to the aforesaid hollow driven shaft with said axle acting as a fulcrum, a gear box with bearings for aforesaid driving shaft and aforesaid driven shaft and aforesaid hollow driven shaft, means for transmitting the power of a driving shaft to two driven shafts having common axes perpendicular to said driving shaft at predetermined torque ratios but at speed ratios dependent on the relative torques of said driven shafts, substantially as described.

3. In power transmission, a revolving driving shaft, a gear box and gear means connected to said box for resisting a predetermined part of the torque of said driving shaft, a revolvable driven shaft with a clockwise torque and a revolvable driven shaft with an anti-clockwise torque, an axle intersecting and rotatable about the axis of aforesaid driving shaft, and gear means rotatable about aforesaid axle for transferring the power from aforesaid driving shaft and aforesaid axle to aforesaid two driven shafts at predetermined torque ratios but at speed ratios dependent on the relative torques of said driven shafts.

4. In power transmission, a revolving driving shaft, a gear box and gear means connected to said box for resisting a predetermined part of the torque of said driving shaft, a revolvable driven shaft with a clockwise torque and a revolvable driven shaft with an anti-clockwise torque, an axle intersecting and rotatable about the axis of aforesaid driving shaft, gear means rotatable about aforesaid axle for transferring the power from aforesaid driving shaft and said axle to aforesaid two driven shafts at predetermined torque ratios but at speed ratios dependent on the relative torques of said two driven shafts, and a friction device which when released allows aforesaid gear means connected to aforesaid gear box to rotate without exerting torque on said gear box.

PAUL CHAPMAN.